United States Patent
Schwartz et al.

(10) Patent No.: US 7,672,906 B2
(45) Date of Patent: Mar. 2, 2010

(54) RANDOMLY GENERATED COLOR GRID USED TO ENSURE MULTI-FACTOR AUTHENTICATION

(76) Inventors: Asaf Schwartz, 45/13 heavy st., Netanya 42258 (IL); Eliran Fadlon, 4 tot st., Lod 71511 (IL)

( * ) Notice: Subject to any disclaimer, the term of this patent is extended or adjusted under 35 U.S.C. 154(b) by 869 days.

(21) Appl. No.: 11/427,417

(22) Filed: Jun. 29, 2006

(65) Prior Publication Data

US 2008/0005035 A1    Jan. 3, 2008

(51) Int. Cl.
    *G06F 17/60* (2006.01)
(52) U.S. Cl. .............. 705/67; 705/64; 705/50; 705/51
(58) Field of Classification Search .......... 705/67, 705/64, 50, 51
    See application file for complete search history.

(56) References Cited

U.S. PATENT DOCUMENTS

| | | | | |
|---|---|---|---|---|
| 5,889,863 | A * | 3/1999 | Weber | 705/76 |
| 6,072,870 | A * | 6/2000 | Nguyen et al. | 705/79 |
| 7,225,249 | B1 * | 5/2007 | Barry et al. | 709/227 |
| 2005/0125360 | A1 | 6/2005 | Tidwell et al. | |
| 2005/0216421 | A1 * | 9/2005 | Barry et al. | 705/64 |

FOREIGN PATENT DOCUMENTS

JP    2002352164 A  * 12/2002

* cited by examiner

*Primary Examiner*—Pierre E Elisca

(57) ABSTRACT

A method and system for ensuring the secure authentication of transactions over a communication network using a validation code 40, wherein the user submits information over a communication terminal and submitting validation code 40 for authentication allows the transaction to be completed, the system comprised of: a substantially transparent alphanumeric cipher card 10 associated with the user information, wherein cipher card 10 contains rows and columns of random alphanumeric characters; and an authentication module for providing validation code 40 to the user whereby a color grid 20 is generated to be displayed on a user terminal, wherein the cells of color grid 20 are randomly filled with one of a plurality of colors and the design of color grid 20 is adapted to cipher card 10 such that upon positioning alphanumeric cipher card 10 over color grid 20, the user can deduce a validation code 40.

17 Claims, 5 Drawing Sheets

RANDOMLY GENERATED COLOR GRID USED TO ENSURE MULTI-FACTOR AUTHENTICATION

FIELD OF INVENTION

This invention relates generally to authentication processes, and specifically to methods that ensure secure authentication when conducting activities over a communication network.

BACKGROUND OF THE INVENTION

Increasingly, business and recreational activities are conducted over the Internet and other types of communication networks. For example, on-line shopping, that is, making purchase over the Internet, is more popular and more common than ever. Unfortunately, as on-line purchasing and other network activities increase, so does the ability of hackers to steal information such as credit card information and passwords, and other personal information. In response to the growing threat, increased security measures are required to protect participants such as purchasers and vendors. These measures usually involve ever more sophisticated methods of verifying purchaser information.

Attempts have been made to provide a solution to this problem by various manners. Illustrative of such attempts are US20050125360, which discloses a method of verifying, for example, second-party checks, wherein the check-cashing entity collects authenticating marks such as watermarks and barcodes, and transmits the collected information for authorization. While such methods are useful in assisting a vendor to assess the risk involved in cashing said check, the purchaser is left open to theft of personal information over the internet.

There is a need for a simple and secure method for conducting activities such as making on-line purchases, wherein a user can complete the process simply, accurately, and in a timely manner, with no need for specialized equipment or computer programs.

SUMMARY OF INVENTION

Presented herein is a novel system for ensuring that credit card purchases made over the internet are secure. A key feature of the present invention is the use of randomly generated color grids that allow the user to derive a unique code for each credit card transaction, in a simple, straightforward manner. This code may then be sent to the financial institution that issued the credit card for authentication.

Another feature of the present invention is a unique cipher card, issued to individual credit card owners, that contains further information required for use with the color grid.

Because only the owner of the credit card and the financial institution that issued the credit card have access to these two pieces of information, that is, the randomly generated color grid and the arrangement of the alphanumeric characters imprinted on the cipher card, the method of the present invention provides a very secure method of validating credit card purchases.

The present invention protects all parties involved from fraudulent credit card use. As a result, the purchaser will be more willing to make on-line purchases, the vendors may safely rely on the revenue from such purchases, and the financial institutions will face lower losses from unauthorized charges.

BRIEF DESCRIPTION OF DRAWINGS

The subject matter regarded as the invention will become more clearly understood in light of the ensuing description of embodiments herein, given by way of example and for purposes of illustrative discussion of the present invention only, with reference to the accompanying drawings, wherein.

Figures 1, 2:
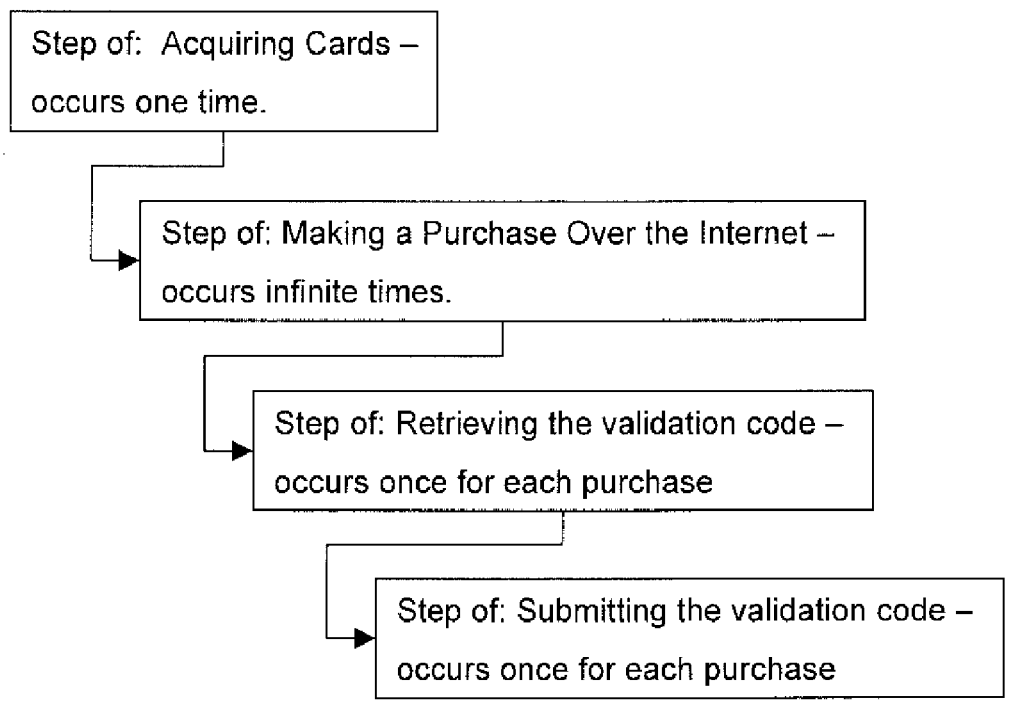
FIG. 1 is an overview flowchart that briefly identifies a typical sequence of steps required of the present invention.
FIG. 2 shows an embodiment of a cipher card of the present invention.

The drawings together with the description make apparent to those skilled in the art how the invention may be embodied in practice.

No attempt is made to show structural details of the invention in more detail than is necessary for a fundamental understanding of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF AN EMBODIMENT OF THE PRESENT INVENTION

An embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiments, but not necessarily all embodiments, of the inventions.

It is understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description below.

It is to be understood that the terms "including", "comprising", "consisting" and grammatical variants thereof do not preclude the addition of one or more components, features, steps, or integers or groups thereof and that the terms are to be construed as specifying components, features, steps or integers.

The phrase "consisting essentially of", and grammatical variants thereof, when used herein is not to be construed as excluding additional components, steps, features, integers or groups thereof but rather that the additional features, integers, steps, components or groups thereof do not materially alter the basic and novel characteristics of the claimed composition, device or method.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" refers to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention can be implemented in the testing or practice with methods and materials equivalent or similar to those described herein.

The terms "bottom", "below", "top" and "above" as used herein do not necessarily indicate that a "bottom" component is below a "top" component, or that a component that is "below" is indeed "below" another component or that a component that is "above" is indeed "above" another component. As such, directions, components or both may be flipped, rotated, moved in space, placed in a diagonal orientation or position, placed horizontally or vertically, or similarly modified. Accordingly, it will be appreciated that the terms "bottom", "below", "top" and "above" may be used herein for exemplary purposes only, to illustrate the relative positioning or placement of certain components, to indicate a first and a second component or to do both.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

The present invention provides a secure authentication process for transactions that occur over a communication network, wherein a random color grid, generated at a remote location on the network, is transmitted to and displayed over a user communication terminal, and the user deduces a validation code by positioning a his substantially transparent alphanumeric cipher card over the color grid and finally submitting the validation code for authentication.

For the purpose of clarity, one embodiment of the present invention, that of validation of a purchase over the internet, is herein discussed in detailed. While said embodiment may be a more common application of the present invention, said description does not preclude additional embodiments of this invention. Indeed, those skilled in the art will envision other applications within the scope of the invention Accordingly, an embodiment of the present invention, which ensures the secure authentication of a commercial transaction through a communication network using a validation code, comprises the following steps, which are briefly shown in FIG. 1:

1—Acquiring a credit card and an associated alphanumeric cipher card 10 from a sponsoring financial institution, 2—Making a purchase over the internet and submitting credit card information, which causes a color grid 20 to be randomly generated and displayed on a computer screen 30, 3—Retrieving a validation code 40 by positioning cipher card 10 over color grid 20 on computer screen 30, said action revealing validation code 40, and 4—Submitting said validation code 40 for authentication, which allows the sales transaction to be completed.

Cipher card 10 of the present invention is the tool required by the user to reveal validation code 40. According to some embodiments, cipher card 10 is issued to a user. An embodiment of cipher card 10 is described in FIG. 2, wherein a grid comprising a plurality of rows and columns may be imprinted on cipher card 10, and each resulting cell may contain an alphanumeric character. The arrangement of the alphanumeric characters on each cipher card 10 may be unique wherein only the owner of the card and the issuing institution will know said arrangement.

Cipher card 10 is constructed from, for example, clear or substantially clear plastic or any other suitable material that is also transparent.

There is the option of including additional information, such as, inter alia, the name of the issuing institution and the name of the card holder. Furthermore, in some embodiments, cipher card 10 may be incorporated into the corresponding credit or debit card.

Figure 3:
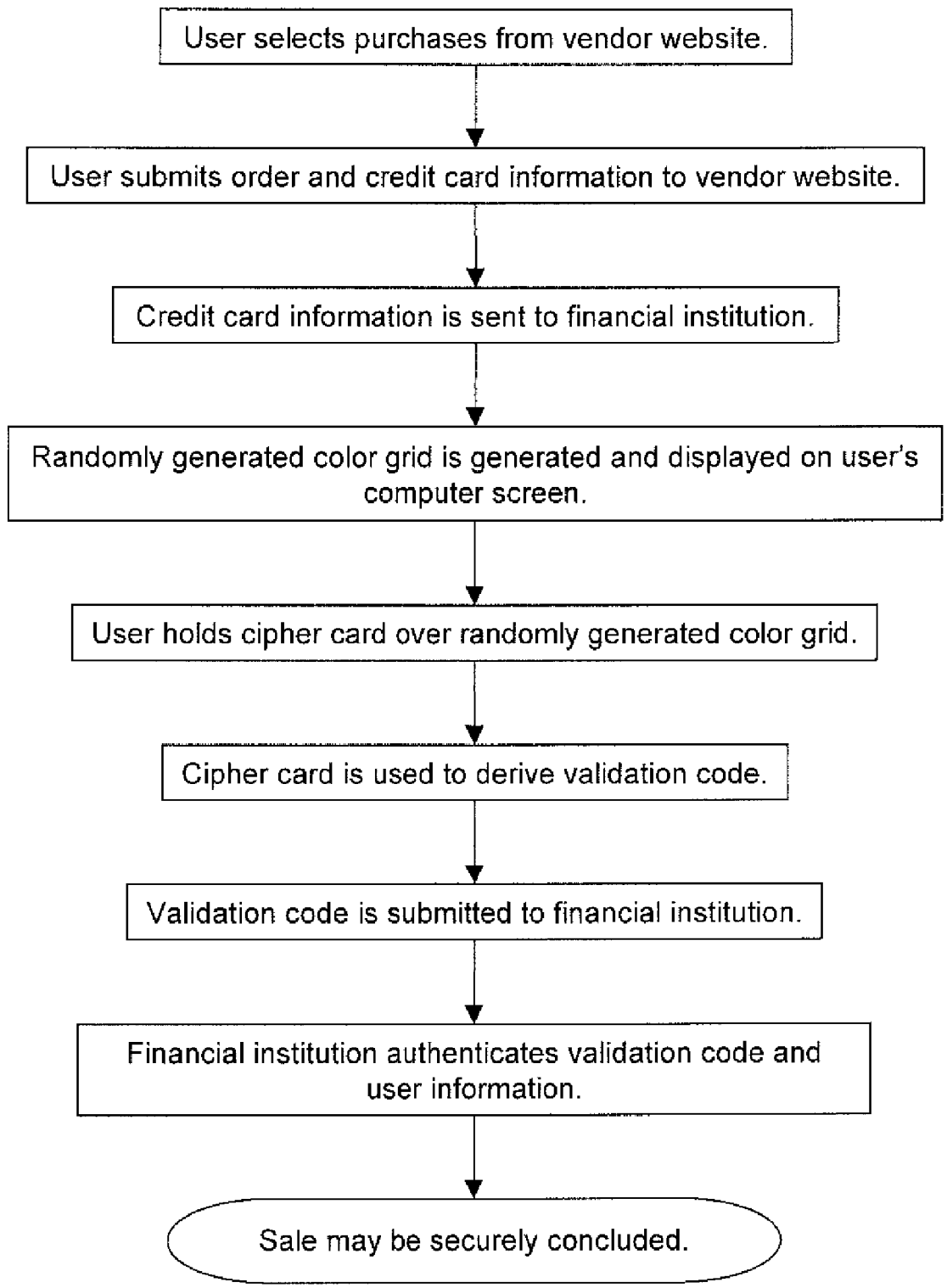
FIG. 3 is a descriptive flowchart of a sequence of events required to generate a random color grid, retrieve a validation code, and submit said validation code for authentication in order to complete an internet purchase, according to the present invention.

As described in the flowchart of FIG. 3, after being issued a credit or debit card, a cipher card 10 may issued to the user. According to some embodiments, cipher card 10 may be issued by the same financial institution that issued the credit card. According to some other embodiments, cipher card 10 may be issued by another institution. Each cipher card 10 is unique and may be used in conjunction with only one credit or debit card.

After a new cipher card 10 is received, the user needs to determine the decrypting color that corresponds to cipher card 10. According to some embodiments, this color may be assigned by the issuing institution. According to some embodiments, this color may be chosen by the user and reported to the issuing institution. According to some embodiments, the decrypting color may be a fixed color. According to some other embodiments, the decrypting color may vary, for example, according to a pre-established order and schedule. The step of making a purchase and submitting the required information allows color grid 20 to be generated and displayed.

Figure 4:
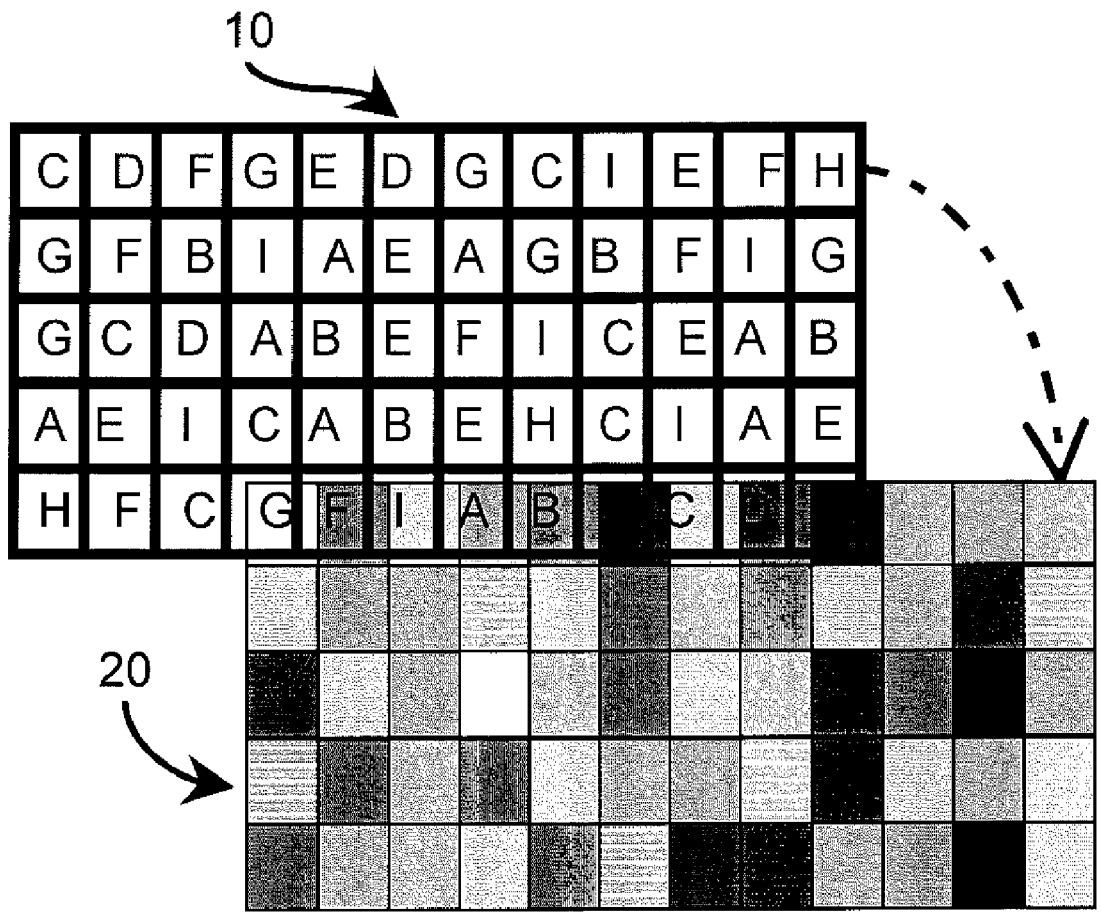
FIG. 4 represents the positioning of a cipher card over a color grid.
Figure 6:
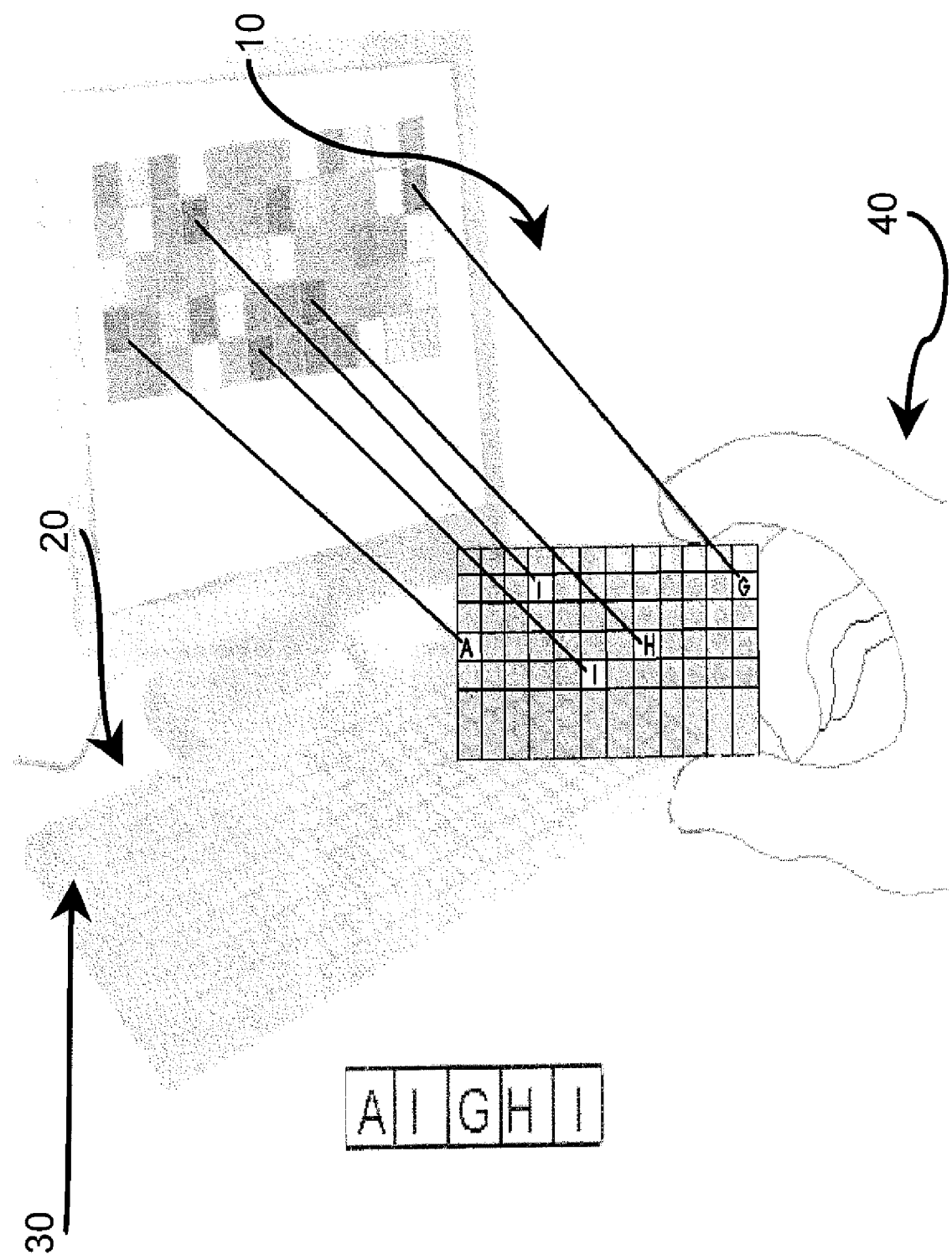
FIGS. 6 and 7 describe a color grid and the corresponding letters from which the final code may be retrieved.
Figure 7:
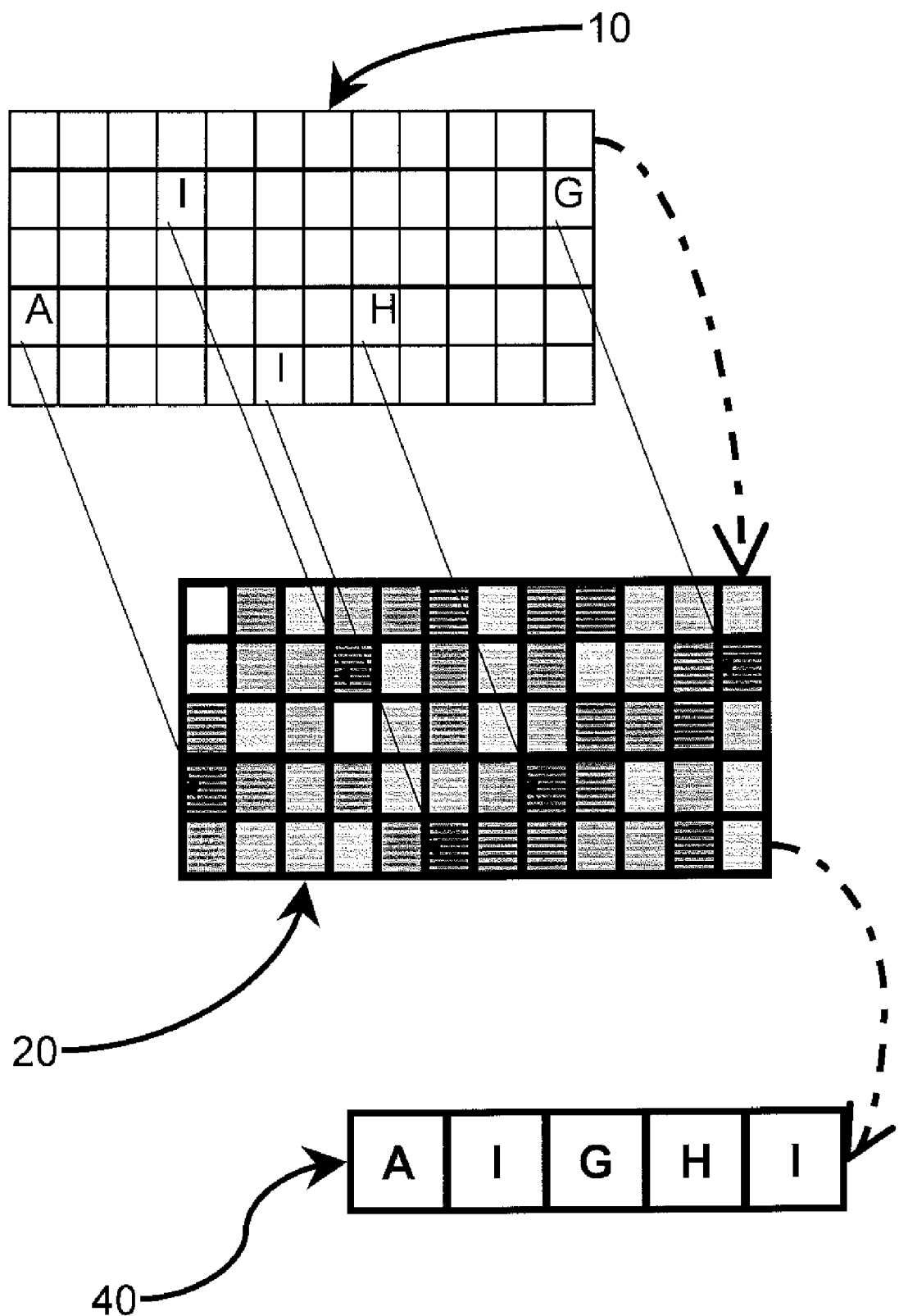

The user may select his purchase or purchases from a vendor website as is known. According to some embodiments, when ready to "check out" or pay for the purchases, the user submits his order, credit card information, and any other information required by the vendor website, according to the guidelines and practices of the vendor website. The credit card information and any other relevant details may then be transmitted to the financial institution, as is known in the art. The financial institution then generates a color grid 20 such as is described in FIGS. 4, 6 and 7 and transmits it to the user, whereupon said color grid 20 may be displayed on the user's screen 30.

Color grid 20 has the same number of rows and columns as cipher card 10, and furthermore, color grid 20 is the same size as the grid on cipher card 10. Each cell of color grid 20 is filled with one of a plurality of colors. The arrangement of the colors in the grid may be random. Each color grid 20 is different.

Once color grid 20 is displayed on screen 30, the user may position cipher card 10 over color grid 20, an action that allows the user to retrieve a validation code 40. This step, represented by FIG. 4, may reoccur of each payment that is to be made over the internet.

According to some embodiments of the present invention, cipher card 10 may be a virtual object which is stored on a user computer terminal or retrievable from a remote location. According to such embodiments, the positioning of cipher card 10 over color grid 20 may occur automatically.

Figure 5:
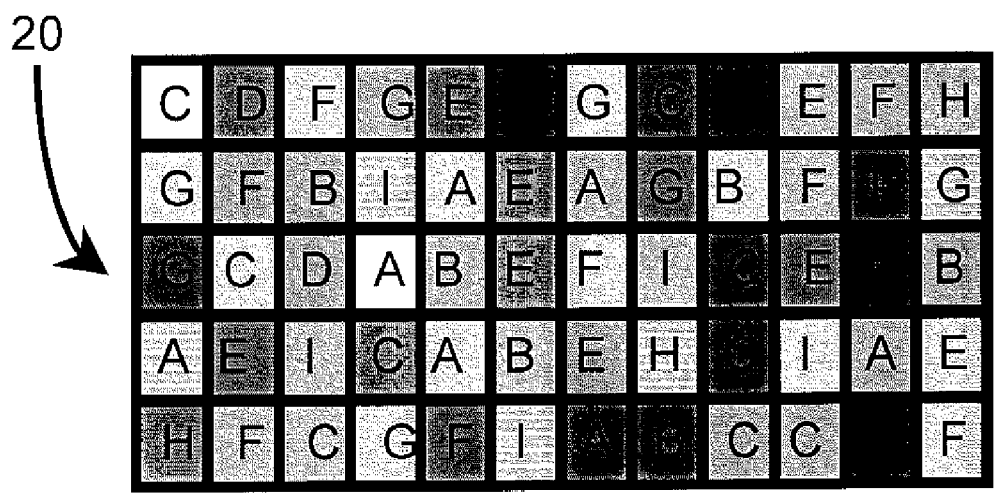
FIG. 5 describes a color grid with a cipher card on top, wherein the letters of the final code may be revealed.

When the card is placed over color grid 20, the alphanumeric characters on cipher card 10 align with the colored cells of color grid 20. Because cipher card 10 is opaque, the colors of color grid 20 show through cipher card 10. This action creates the appearance of a single grid whose cells each contain an alphanumeric character in a colored background, as seen in FIG. 5.

The user is able to determine his validation code 40 by referring to the aforementioned deciphering color and identifying the plurality of alphanumeric characters that sit within the cells that are the same color as the deciphering color. An example of this action may be seen in FIGS. 6 and 7. The alphanumeric characters provide the user with validation code 40. According to the example given in FIGS. 6 and 7, such a validation code 40 may be, for example, "AIGHI", wherein the alphanumeric characters "A", "I", "G", "H", and "I" are the only characters that are positioned on cells that are the same color as the deciphering color.

Validation code 40 of some embodiments of the present invention may a predetermined quantity of alphanumeric characters randomly chosen by the user from the group of characters that sit within the cells that are the same color as the deciphering color.

Once acquired, validation code 40 may be submitted over the internet to the financial institution According to some other embodiments, after "checking out" but before submitting payment information, color grid 20 may be generated and displayed on the user's screen 30. Then, for example, validation code 40 may be submitted along with the credit card information and any other required data.

The financial institution authenticates validation code 40 that has been generated by the user and any additional information that the vendor website may have submitted. Once the authentication is complete, the financial institution may transmit confirmation to the vendor website. The sale transaction may be completed when the confirmation is received by the vendor website.

While the invention has been described with respect to a limited number of embodiments, these should not be construed as limitations on the scope of the invention, but rather as exemplifications of some of the embodiments. Those skilled in the art will envision other possible variations, modifications, and applications that are also within the scope of the invention. Accordingly, the scope of the invention should not be limited by what has thus far been described, but by the appended claims and their legal equivalents. Therefore, it is to be understood that alternatives, modifications, and variations of the present invention are to be construed as being within the scope and spirit of the appended claims.

What is claimed is:

1. A method for securing the authentication of transactions taken place over a communications network using a validation code, wherein a user submits over said communications network information using a communication terminal, said method comprising the steps of:

the user submitting information via a communication terminal;

said user further sending said information via a communications network to a remote location on said communications network;

generating a random color grid at said remote location upon receiving said information;

sending said grid to said communications terminal of said user;

displaying said grid at a monitor of said communications terminal of said user ;

positioning a transparent alphanumeric cipher card having rows and columns over said grid such that upon positioning said alphanumeric cipher card over said color grid, the cells of said grid are aligned over said color grid cells, said cipher card containing rows and columns of random alphanumeric characters, associated with user information;

matching said color grid with a cipher card containing rows and columns of random alphanumeric characters;

transforming said color grid to an alphanumeric validation code; and, submitting said validation code for authentication over said communications network to said remote location by using said communications terminal.

2. The method of claim 1 wherein said cipher card is incorporated into a corresponding credit or debit card.

3. The method of claim 1 wherein each cipher card is used in conjunction with only one credit or debit card.

4. The method of claim 1 wherein the authentication module requires the user to use a decrypting color for extracting the validation code.

5. The method of claim 4 wherein said decrypting color is a fixed color.

6. The method of claim 4 wherein said decrypting color varies according to a pre-established order and schedule.

7. The method of claim 1 wherein a financial institution generates said color grid and transmits it to the user terminal.

8. A method of claim 4 wherein said validation code is deduced by positioning said cipher card over said color grid and referring to said deciphering color to identify a plurality of alphanumeric characters that sit within the cells that are the same color as said deciphering color.

9. The method of claim 4 wherein said validation code comprises a predetermined quantity of alphanumeric characters randomly chosen by the user from the group of alphanumeric characters that appearing within the cells that have the same color as the deciphering color.

10. A method for securing the authentication of transactions taking place over a communications network using a validation code, wherein a user submits over said communication network information using a communications terminal, said method comprising the steps of:
   the user submitting information via a communications terminal;
   said user further sending said information via a communications network to a remote location on said communication network;
   generating a random color grid at said remote location upon receiving said information;
   sending said grid to said communication terminal of said user;
   displaying said grid at a monitor of said communication terminal of said user;
   positioning a virtual alphanumeric cipher card having rows and columns over said grid such that upon positioning said virtual alphanumeric cipher card over said color grid, the cells of each are aligned over said color grid cells, said virtual alphanumeric cipher card containing rows and columns of random alphanumeric characters, associated with user information, said virtual alphanumeric cipher card stored in said communication terminal;
   matching said color grid with said virtual alphanumeric cipher card containing rows and columns of random alphanumeric characters;
   transforming said color grid to an alphanumeric validation code; and,
   submitting said validation code for authentication over said communication network to said remote location by using said communications terminal.

11. The method of claim 10 wherein each virtual alphanumeric cipher card is used in conjunction with only one credit or debit card.

12. The method of claim 10 wherein the authentication module requires the user to use a decrypting color for extracting the validation code.

13. The method of claim 12 wherein said decrypting color is a fixed color.

14. The method of claim 12 wherein said decrypting color varies according to a pre-established order and schedule.

15. A method of claim 12 wherein said validation code is extracted by assigning said virtual alphanumeric cipher card over said color grid and referring to said deciphering color to identify a plurality of alphanumeric characters that sit within the cells that are the same color as said deciphering color.

16. The method of claim 12 wherein said validation code comprises of a predetermined quantity of alphanumeric characters randomly chosen by the user from the group of alphanumeric characters that show within the cells that having the same color as the deciphering color.

17. The method of claim 10 wherein a financial institution generates said color grid and transmits it to the user terminal.

* * * * *